(12) United States Patent
Lee

(10) Patent No.: US 8,082,001 B2
(45) Date of Patent: Dec. 20, 2011

(54) MULTI-MODE MOBILE COMMUNICATION TERMINAL AND METHOD FOR REDUCING POWER CONSUMPTION THEREOF

(75) Inventor: Sung-Kyu Lee, Anyang (KR)

(73) Assignee: LG Electronics Inc., Seoul (KR)

( * ) Notice: Subject to any disclaimer, the term of this patent is extended or adjusted under 35 U.S.C. 154(b) by 930 days.

(21) Appl. No.: 11/617,156

(22) Filed: Dec. 28, 2006

(65) Prior Publication Data

US 2007/0171882 A1 Jul. 26, 2007

(30) Foreign Application Priority Data

Dec. 30, 2005 (KR) .................. 10-2005-0136132

(51) Int. Cl.
*H04Q 7/20* (2006.01)
(52) U.S. Cl. .................... 455/552.1; 370/328
(58) Field of Classification Search ............... 370/331
See application file for complete search history.

(56) References Cited

U.S. PATENT DOCUMENTS

| | | | | |
|---|---|---|---|---|
| 5,475,677 | A * | 12/1995 | Arnold et al. ............ | 370/280 |
| 6,487,425 | B1 * | 11/2002 | Thakker et al. ........... | 455/574 |
| 7,583,985 | B2 * | 9/2009 | Matson et al. ............ | 455/574 |
| 7,606,190 | B2 * | 10/2009 | Markovic et al. ......... | 370/328 |
| 2002/0197992 | A1 * | 12/2002 | Nizri et al. ............ | 455/435 |
| 2003/0119489 | A1 | 6/2003 | Mohammed | |
| 2003/0147364 | A1 | 8/2003 | Watanabe et al. | |
| 2004/0002330 | A1 * | 1/2004 | Chitrapu ............ | 455/426.2 |
| 2004/0071112 | A1 * | 4/2004 | Hsu et al. ............ | 370/331 |
| 2005/0208966 | A1 | 9/2005 | David et al. | |
| 2005/0282579 | A1 * | 12/2005 | Kim ............ | 455/552.1 |
| 2006/0119706 | A1 | 6/2006 | An | |
| 2006/0146366 | A1 | 7/2006 | Jang | |
| 2006/0146880 | A1 | 7/2006 | Kim | |
| 2006/0153236 | A1 | 7/2006 | Kang | |
| 2006/0154682 | A1 | 7/2006 | Shim | |
| 2006/0205429 | A1 | 9/2006 | Ryoo | |
| 2007/0013768 | A1 | 1/2007 | Hwang | |
| 2007/0030124 | A1 | 2/2007 | Lee | |
| 2007/0047504 | A1 | 3/2007 | Akram et al. | |
| 2007/0129045 | A1 * | 6/2007 | Aerrabotu ............ | 455/343.5 |

FOREIGN PATENT DOCUMENTS

| | | |
|---|---|---|
| EP | 1335528 | 8/2003 |
| EP | 1578095 | 9/2005 |
| GB | 2403098 | 12/2004 |

* cited by examiner

*Primary Examiner* — Dwayne Bost
*Assistant Examiner* — Joseph Dean, Jr.
(74) *Attorney, Agent, or Firm* — Ked & Associates LLP

(57) ABSTRACT

A mobile communication terminal includes a first communication module which communicates with a licensed network, a second communication module which communicates with a generic access network, and a controller which switches the first communication module between a hibernation mode and another mode according to whether the second communication module is activated.

34 Claims, 9 Drawing Sheets

(a)

(b)

(c)

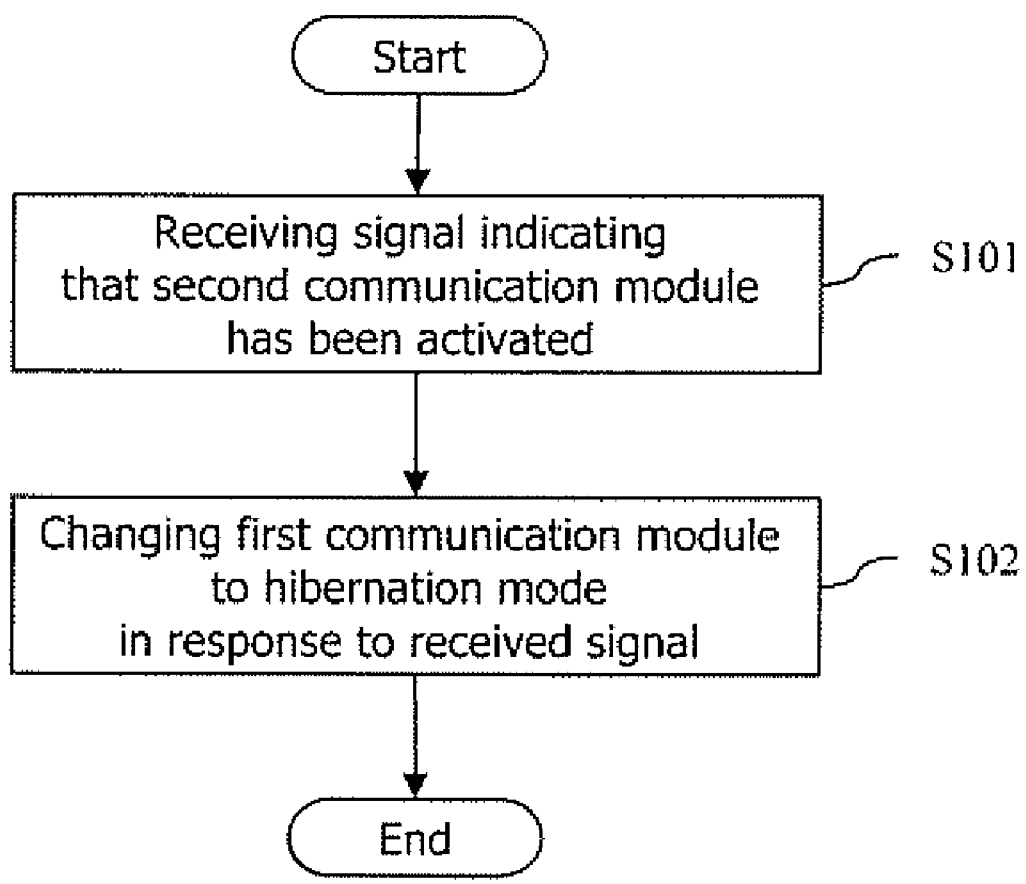

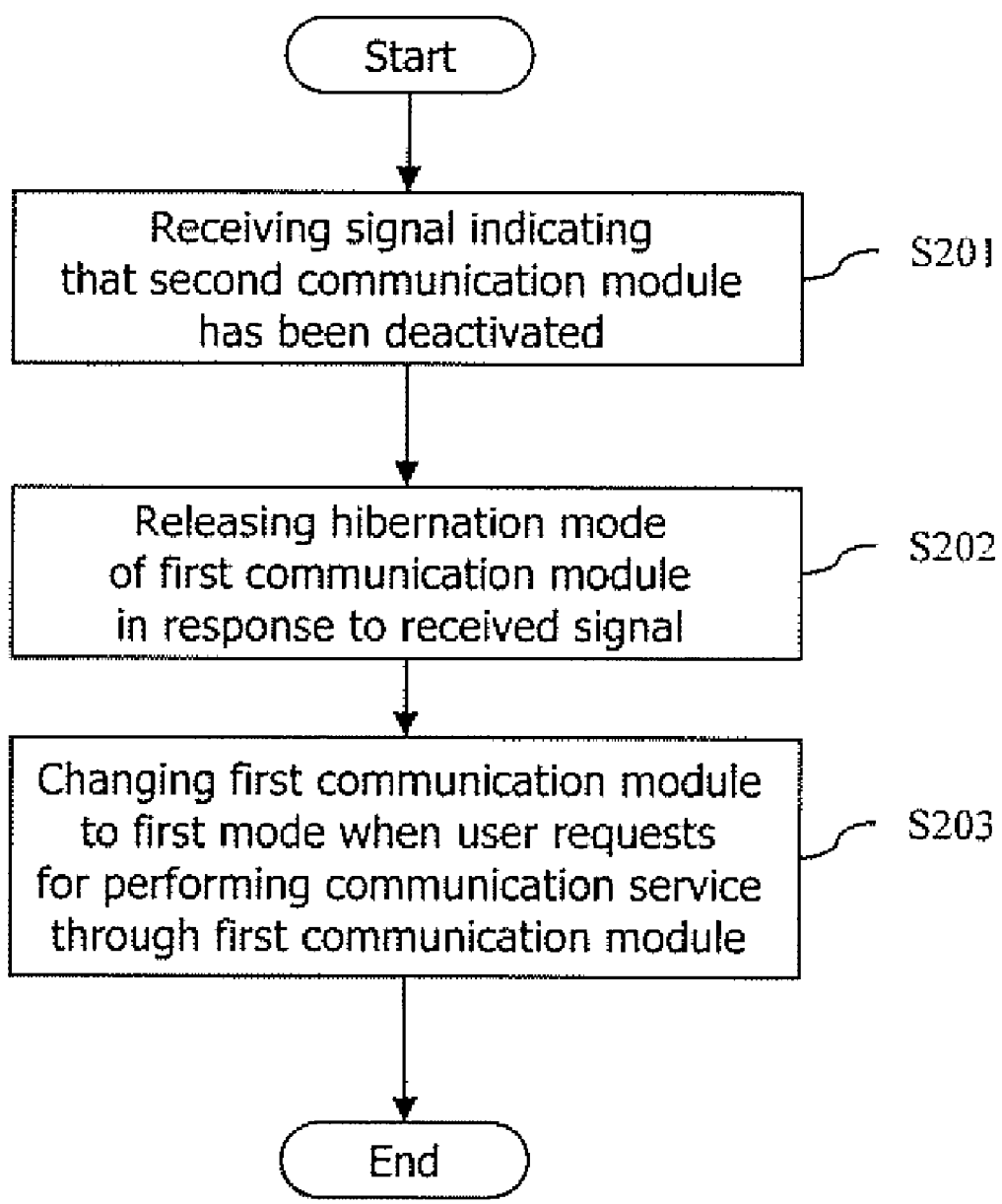

MULTI-MODE MOBILE COMMUNICATION TERMINAL AND METHOD FOR REDUCING POWER CONSUMPTION THEREOF

This application claims the benefit of Korean Patent Application No. 10-2005-0136132, filed on Dec. 30, 2005, which is hereby incorporated by reference in its entirety.

BACKGROUND OF THE INVENTION

1. Field of the Invention

The present invention relates to a multi-mode mobile communication terminal which includes two or more communication modules which communicate with two or more different communication services, and more particularly, to a mobile communication terminal and method capable of reducing power consumption of a first communication module of the mobile communication terminal according to activation of a second communication module.

2. Description of the Related Art

FIG. 1 illustrates ways in which related art terminals connect to communication networks. FIG. 1(a) illustrates a related art terminal 21 which wirelessly connects with a base station 11 of a licensed network. FIG. 1(b) illustrates a related art terminal 22 which wirelessly connects with an access point (AP) 12 of a Generic Access Network (GAN) (also referred to as an Unlicensed Mobile Access (UMA) network) utilizing private unlicensed spectrum technology. FIG. 1(c) illustrates a related art dual-mode terminal 23 which can connect to both a base station 11 and an AP 12. The terminals 21 and 23 can perform voice and data communication with the base station 11, and the terminals 22 and 23 can perform voice and data communication with the AP 12. To perform voice communication with the AP 12, the terminals 22 and 23 may use, for example, Voice Over IP (VOIP) technology.

Non-limiting examples of the licensed network, which is a mobile communication network utilizing licensed radio frequency spectrum, include a Code Division Multiple Access (CDMA) network, a Global System for Mobile Communication (GSM) network: a General Packet Radio Service (GPRS) network, a Time Division Multiple Access (TDMA) network, a Wideband-CDMA (WCDMA) network, and an International Mobile Telecommunications-2000 (IMT-2000) network. Non-limiting examples of unlicensed spectrum technology which can be used to connect to the GAN network include a Wireless Local Area Network (WLAN) technology (such as one utilizing IEEE 802.11 or 802.16 standards), and Bluetooth.

When the related art terminal 23 performs communication through the AP 12, it periodically monitors signals transmitted by the base station 11. A disadvantage of this is that the related art terminal 23 consumes power when it monitors the signals from the base station 11.

SUMMARY OF THE INVENTION

One of the features of the present invention is a multi-mode communication terminal in which power consumption is reduced.

To achieve at least this feature there is provided a mobile communication terminal which includes a first communication module which communicates with a licensed network, a second communication module which communicates with a generic access network, and a controller which switches the first communication module between a hibernation mode and another mode according to whether the second communication module is activated.

The controller may switch the first communication module to the hibernation mode when it is recognized that the second communication module has been activated. The second communication module may activate when a user of the mobile communication terminal requests that communication with the generic access network be performed. The second communication module may activate when the mobile communication terminal enters a service area of the generic access network. The second communication module may activate when a connection with an access point of the generic access network is initiated. The first communication module does not perform voice or data communication, cell detection, cell selection or cell re-selection when it is in the hibernation mode.

The controller may switch the first communication nodule to another mode when it is recognized that the second communication module has been deactivated. The second communication module may be deactivated when a user requests termination of communication with the generic access network. The second communication module may be deactivated when the mobile communication terminal leaves a service area of the generic access network. The second communication module may be deactivated when a user requests termination of a connection to an access point of the generic access network.

Initiating an operation to perform cell searching, cell selection or cell re-selection through the first communication module may switch the first communication module to an idle mode. The first communication module may be switched to another mode by applying greater power to the first communication module. The controller can also switch the first communication module to a dedicated mode. The controller may switch the first communication module to the dedicated mode when a user of the mobile communication terminal initiates a voice or data communication with the licensed network.

There is also provided a method for reducing power consumption in a mobile communication terminal including a first communication module which communicates with a licensed network and a second communication module which communicates with a generic access network. The method includes recognizing activation of the second communication module, and changing the first communication module to a hibernation mode in response to the recognition of the activation of the second communication module.

The second communication module may activate when a user of the mobile communication terminal requests that communication with the generic access network be performed. The second communication module may activate when the mobile communication terminal enters a service area of the generic access network. The second communication module may activate when a connection with an access point of the generic access network is initiated.

Changing to the hibernation mode may include switching from another mode to the hibernation mode. The first communication module does not perform voice or data communication, cell detection, cell selection or cell re-selection when it is in the hibernation mode.

The method may also include recognizing that the second communication module has been deactivated, and switching the first communication module to another mode in response to the recognition of the deactivation. The second communication module may be deactivated when a user requests termination of communication with the generic access network. The second communication module may be deactivated when the mobile communication terminal leaves a service area of the generic access network. The second communication module may be deactivated when a user requests termination of a connection to an access point of the generic access network.

Initiating an operation to perform cell searching, cell selection or cell re-selection through the first communication module may switch the first communication module to the idle mode. The first communication module may be switched to the idle mode by applying greater power to the first communication module.

The method may also include receiving a request to perform a communication with the first communication module from a user, and switching the first communication module to a dedicated mode according to the request. The first communication module may be switched to the dedicated mode by applying greater power to the first communication module.

There is also provided a method for reducing power consumption in a mobile communication terminal including a first communication module which communicates with a licensed network and a second communication module which communicates with a generic access network. The method includes notifying, by an upper layer of the second communication module, an upper layer of the first communication module that the second communication module has been activated, requesting, by the upper layer of the first communication module, a physical layer of the first communication module to enter a hibernation mode in response to the notification, and entering, by the physical layer, the hibernation mode in response to the request.

The method may also include notifying, by the upper layer of the second communication module, the upper layer of the first communication module that the second communication module has been deactivated, requesting, by the upper layer of the first communication module, the physical layer of the first communication module to enter into another mode in response to the notification, and entering, by the physical layer, the idle mode in response to the request.

The upper layer of the first communication module may be a GSM-RR sub-layer, and the upper layer of the second communication module may be a UMA-RR sub-layer. The upper layer of the first communication module may be a GSM-RLC sub-layer, and the upper layer of the second communication module may be a UMA-RLC sub-layer.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 8 is a flow chart illustrating a process of reducing power consumption by changing the first communication module to the hibernation mode; and FIG. 9 is a flow chart illustrating the process of releasing the hibernation mode.

DETAILED DESCRIPTION OF THE INVENTION

Figure 1:
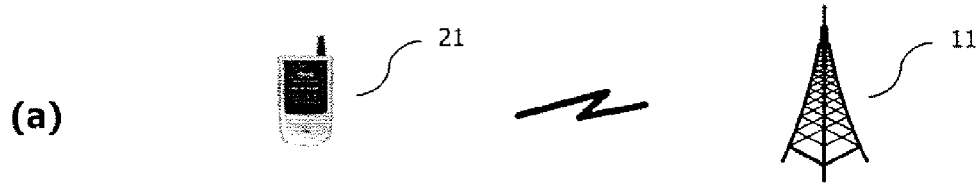
FIG. 1 illustrates ways in which related art terminals connect to communication networks.
Figure 1:
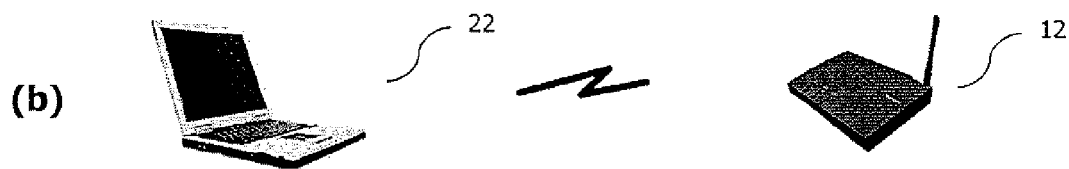
Figure 1:
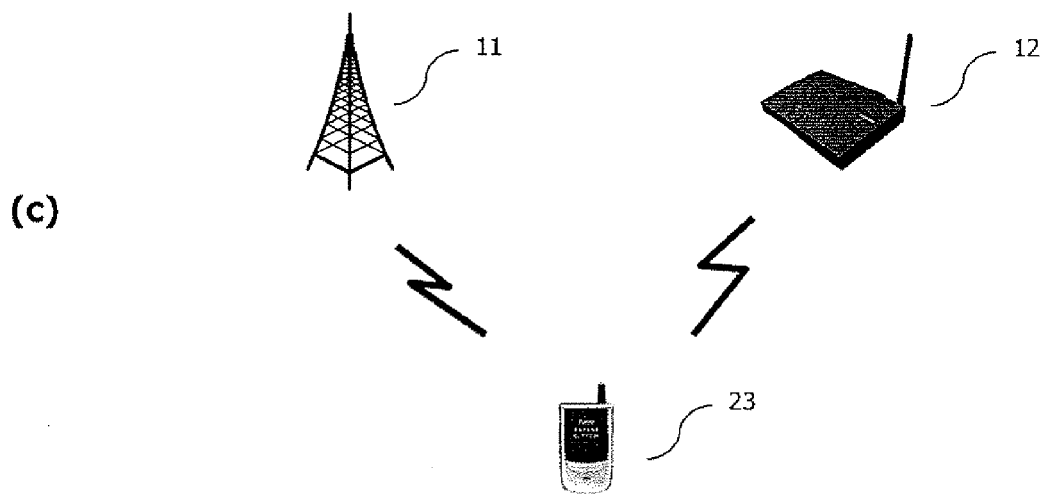

The present invention will now be described in detail with reference to the accompanying drawings.

In describing the present invention, a detailed explanation for a related known function or construction will be omitted to clarify the gist of the present invention, and in explaining various exemplary embodiments, elements that perform the same function are given the same reference numerals.

Figure 2:
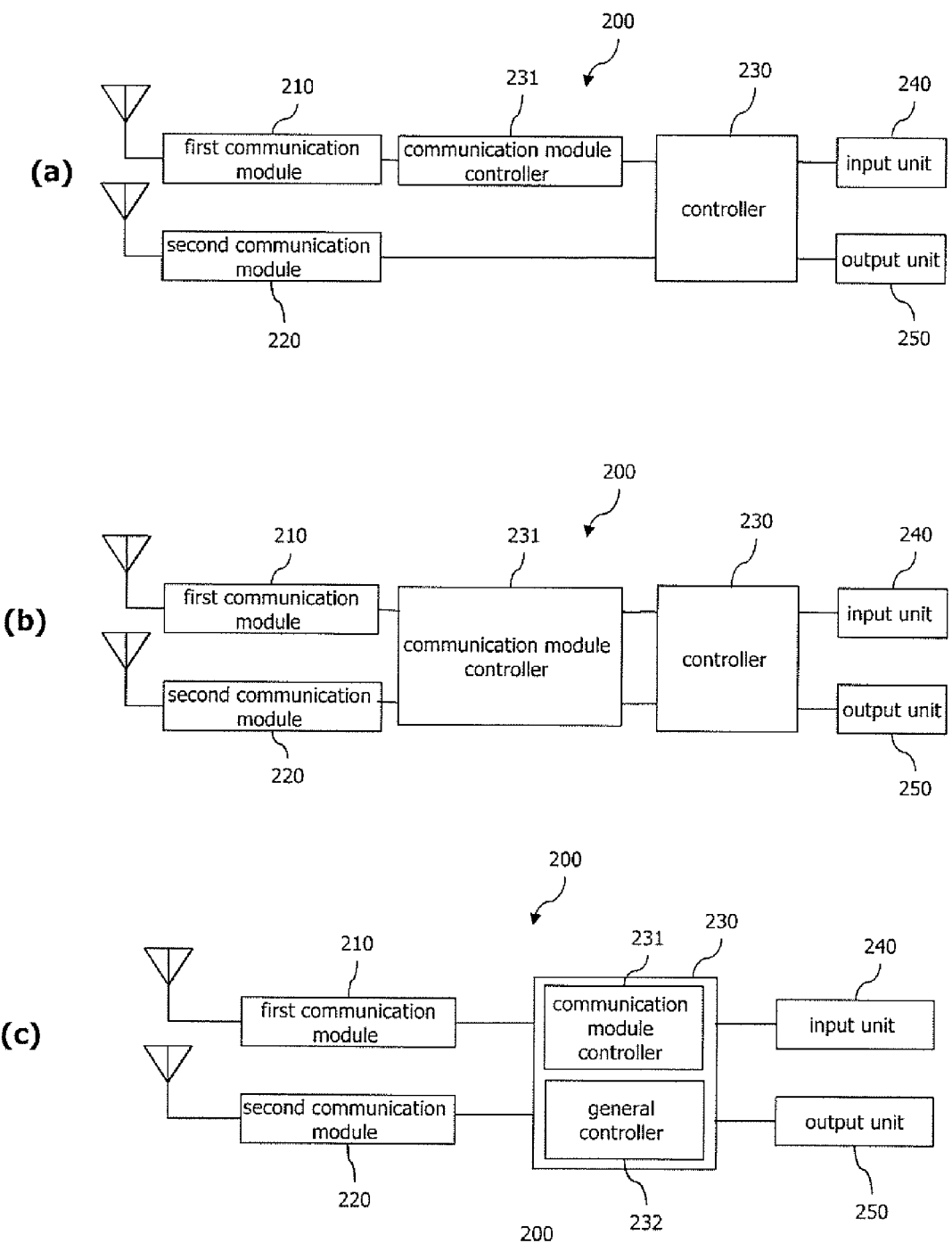
FIG. 2A is a schematic block diagram showing a mobile communication terminal 200 according to a first exemplary embodiment of the present invention.
FIG. 2B is a schematic block diagram showing a mobile communication terminal 200 according to a second exemplary embodiment of the present invention.
FIG. 2C is a schematic block diagram showing a mobile communication terminal 200 according to a third exemplary embodiment of the present invention.

FIG. 2A is a schematic block diagram showing a mobile communication terminal 200 according to a first exemplary embodiment of the present invention, FIG. 2B is a schematic block diagram showing a mobile communication terminal 200 according to a second exemplary embodiment of the present invention, and FIG. 2C is a schematic block diagram showing a mobile communication terminal 200 according to a third exemplary embodiment of the present invention.

The mobile communication terminal 200 is a terminal which performs wireless communication. Non-limiting examples of such a terminal include a mobile phone, a personal digital assistant (PDA), and a notebook computer. The mobile communication terminal 200 may include a first communication module 210, a second communication module 220, a controller 230 which controls main functions of the mobile communication terminal 200, a communication module controller 231, an input unit 240 and an output unit 250.

The first communication module 210 may include electronic components for performing communication with a licensed network. Non-limiting examples of the licensed network include a COSMA network, a GSM network, a GPRS network, a TDMA network, a WCDMA network, and an IMT-2000 network. The first communication module 210 is electrically connected with the communication module controller 231.

The second communication module 220 may include electronic components for performing communication with a GAN network using unlicensed spectrum technology. Non-limiting examples of the unlicensed spectrum technology which can be used to connect to a CAN network include a WLAN technology (such as one utilizing IEEE 802.11 or 802.16 standards), and Bluetooth. In the embodiment shown in FIG. 2A, the second communication module 220 is electrically connected with the controller 230.

Figure 3:
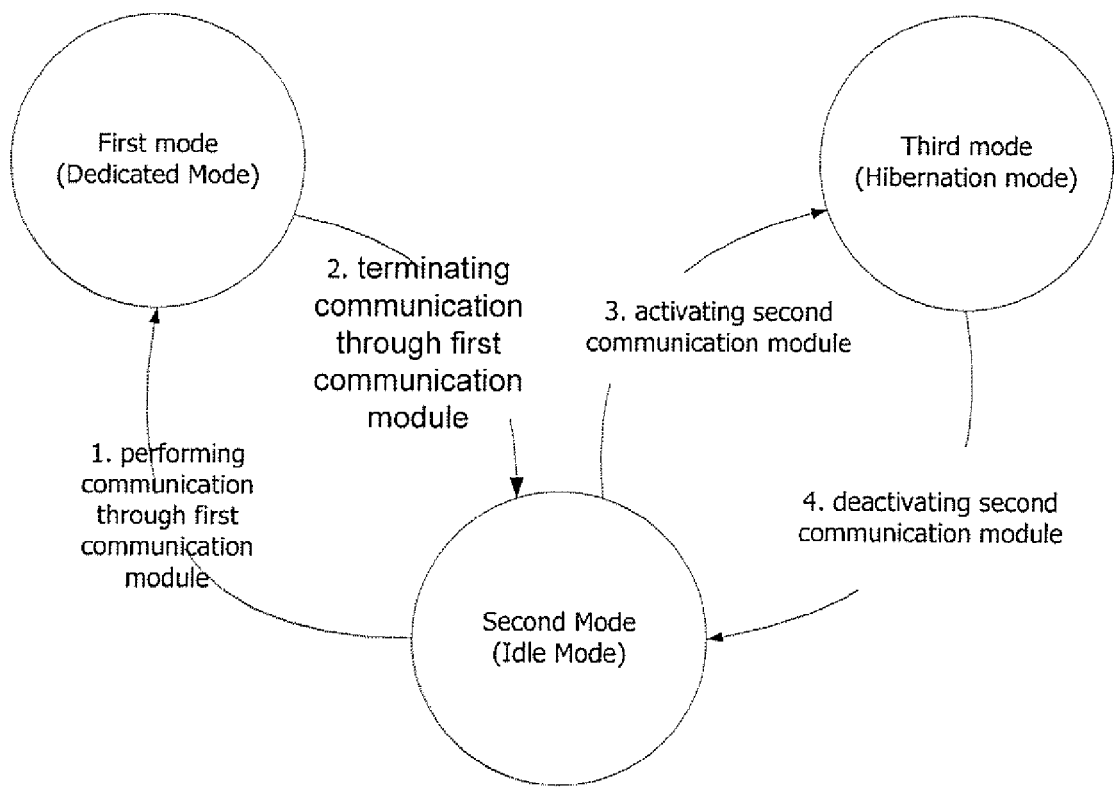
FIG. 3 is a conceptual view showing three modes that can be applicable to a first communication module of the mobile communication terminal in FIGS. 2A to 2C.

In the embodiment shown in FIG. 2A, the communication module controller 231 is electrically connected with the first communication module 210 and the controller 230. As shown in FIG. 3, the communication module controller 231 can control the first communication module 210 by changing it to three or more modes.

In this case, the three or more modes may include a dedicated mode (or a first mode) in which the first communication module 210 performs voice or data communication; an idle mode (or a second mode) in which the first communication module 210 does not perform voice or data communication service, but does perform cell detection, cell selection or cell re-selection; and a hibernation mode (or a third mode) in which the first communication module 210 does not perform voice or data communication and does not perform cell detection, cell selection or cell re-selection.

When the first communication module 210 is in the idle mode, it consumes less power than when it is in the dedicated mode, and when it is in the hibernation mode, it consumes less power than when it is in the idle mode.

When the first communication module 210 is in the idle mode, when a user of the mobile communication terminal 200 inputs a command to perform voice or data communication, the first communication module 210 switches from the idle mode to the dedicated mode. After the voice or data communication is terminated, the first communication module 210 switches back to the idle mode.

The first communication module 210 switches between the idle mode and the hibernation mode based upon activation of the second communication module 220, as shown in FIG. 3.

In this regard, when the first communication module 210 is in the idle mode, when the second communication module 220 is activated, the first communication module 210 switches to the hibernation mode. When the second communication module 220 is deactivated, the first communication module 210 switches back to the idle mode. The second communication module 200 may activate, for example, when the mobile communication terminal 200 enters a service area of a GAN AP, or when a user of the mobile communication terminal 200 enters a command to perform communication with a GAN ARP When the second communication module 220 is activated, it sends a signal to the communication mode controller 231 to inform it of the same. In the embodiment shown in FIG. 2(a), the signal is sent via the controller 230.

The controller 230 includes a plurality of semiconductor devices to control the second communication module, the communication module controller 231, the input unit 240 and the output unit 250, and is electrically connected with them. Accordingly, the controller 230 can transfer the transmitted signal to the communication module controller 231 as the second communication module is activated.

In addition, the controller 230 can handle general controlling of the mobile communication terminal 200. For example, the controller 230 may control the input unit 240 and the output unit 250 for receiving an input from a user through the input unit 240 or performing displaying, illuminating, reproducing a sound or vibration through the output unit 250. The details thereof will be omitted such that the gist of the present invention is not unnecessarily obscured.

The controller 230 controls the second communication module 220, the communication module controller 231, the input unit 240 and the output unit 250. The controller 230 may be implemented, for example, with one or more semiconductor devices. The controller 230 controls main functions of the mobile communication terminal 200, such as, for example, processing input signals received from the input unit 240, and controlling display, illumination, vibration and/or sound outputs of the output unit 250. The controller 230 also sends an activation signal from the second communication module 220 to the communication module controller 231.

FIG. 2B shows a mobile communication terminal 200 according to the second embodiment of the present invention. The mobile communication terminal 200 according to the second embodiment of the present invention includes the same elements as those of the mobile communication terminal 200 according to the first embodiment of the present invention as shown in FIG. 2A.

However, as shown in FIG. 2B, in the mobile communication terminal 200 according to the second embodiment of the present invention, the communication module controller 231 is connected with the first communication module 210, the second communication module 220 and the controller 230.

According to this construction, the second communication module 220 can directly transmit a signal indicating that the second communication module 200 has been activated to the communication module controller 231, not by way of the controller 230.

FIG. 2C shows the mobile communication terminal 200 according to the third embodiment of the present invention. The mobile communication terminal 200 according to the third embodiment of the present invention includes the same elements as those of the mobile communication terminal 200 according to the first embodiment of the present invention as shown in FIG. 2A.

However, as noted in FIG. 2C, in the mobile communication terminal 200 according to the third embodiment of the present invention, the communication module controller 231 is provided as part of the controller 230. In this embodiment, the controller 230 includes a general controller 232 which controls main functions of the mobile communication terminal 200, and the communication module controller 23 1.

Up to now, the construction of the mobile communication terminal according to the exemplary embodiments of the present invention has been described. Hereinbelow, changing the first communication mode to the hibernation mode and controlling it by the communication controller 231 will now be described.

Figure 4:
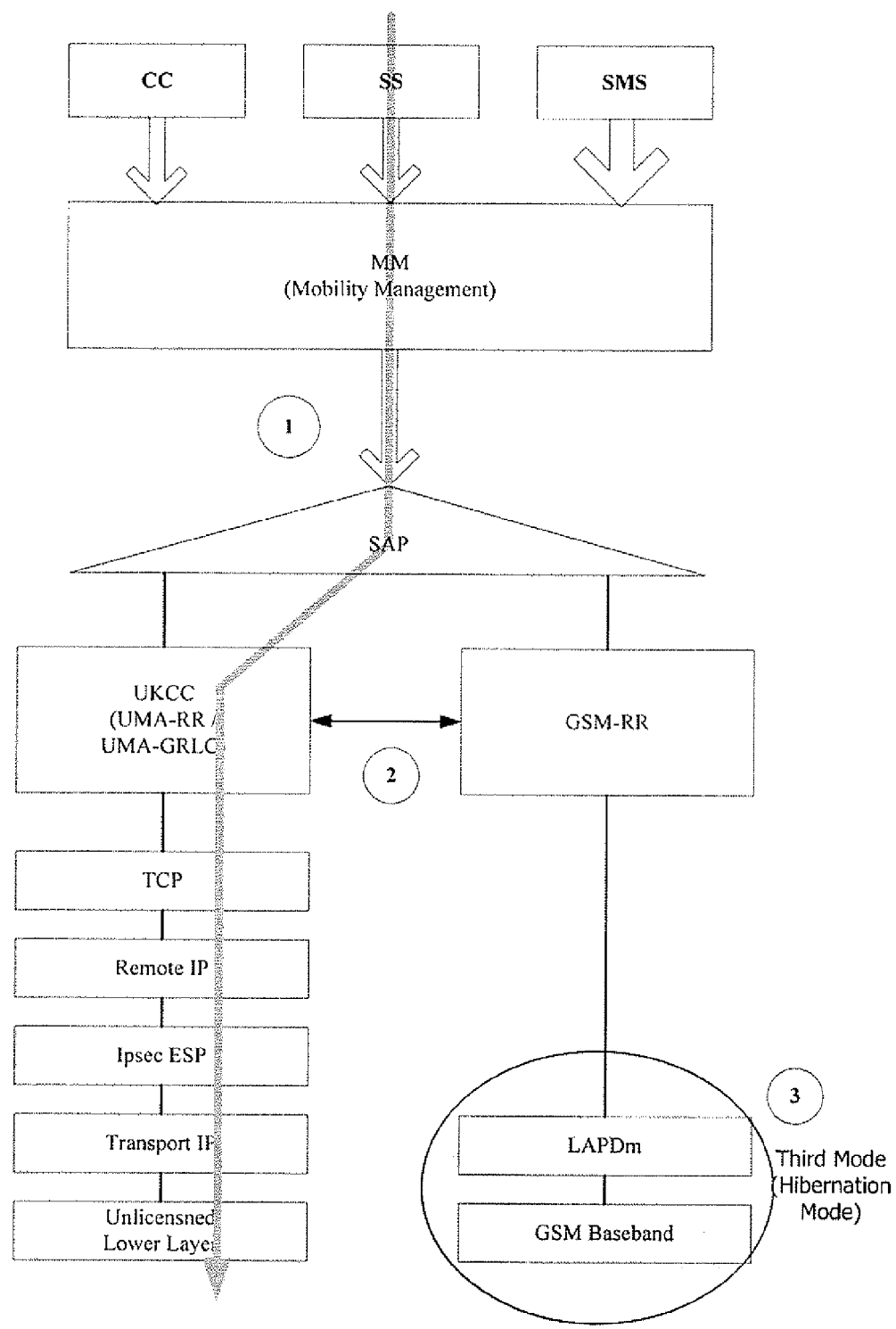
FIG. 4 illustrates an example of a process for reducing power consumption according to the present invention, in which the mobile communication terminal 200 operates on a GSM network.
Figure 5:
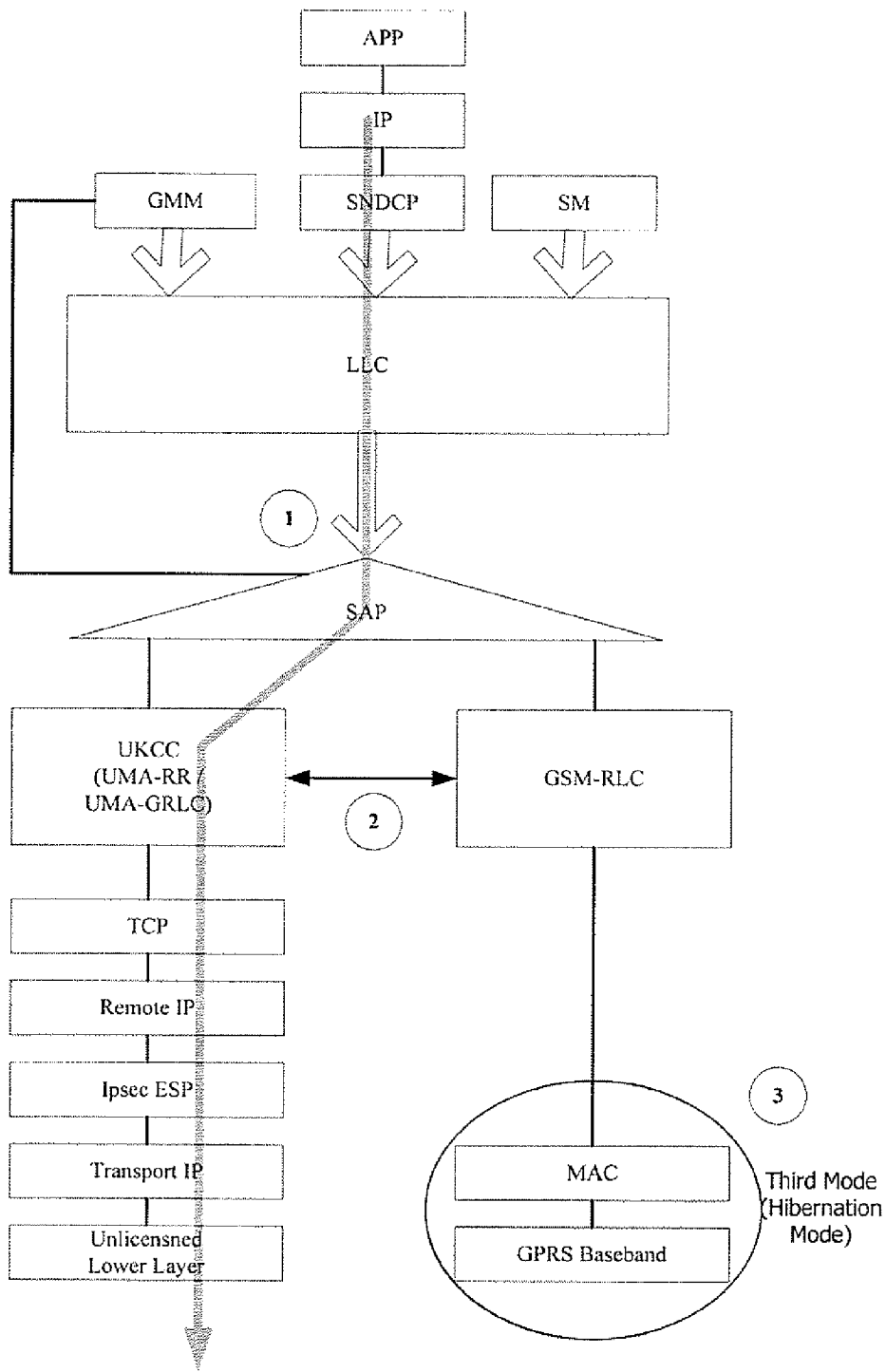
FIG. 5 illustrates another example of a process for reducing power consumption according to the present invention, in which the mobile communication terminal 200 operates on a GPRS network.

FIG. 4 illustrates an example of a process for reducing power consumption according to the present invention, in which the mobile communication terminal 200 operates on a GSM network. FIG. 5 illustrates another example of a process for reducing power consumption according to the present invention, in which the mobile communication terminal 200 operates on a GPRS network.

The mobile communication terminals 200 shown in FIGS. 4 and 5 operate in accordance with the Open Systems Interconnection (OSI) model. The first communication module 210 of the mobile communication terminal 200 shown in FIG. 4 utilizes a physical layer protocol and a Radio Resource (RR) network sub-layer protocol which are different than those utilized by the second communication module 220. However, the first communication module 210 and the second communication module 220 utilize the same upper layer protocols (such as the same Mobility Management (MM) network sub-layer protocol).

The first communication module 210 of the mobile communication terminal 200 shown in FIG. 5 utilizes a physical layer protocol and a Radio Link Control (RLC) data link sub-layer protocol which are different than those utilized by the second communication module 220. However, the first communication module 210 and the second communication module 220 utilize the same upper layer protocols (such as the same Logical Link Control (LLC) data link sub-layer protocol).

In the example illustrated in FIG. 4, the second communication module 220 utilizes a UMA-RR network sub-layer protocol, and the first communication module 210 utilizes a GSM-RR network sub-layer protocol. In the example illustrated in FIG. 5, the second communication module 220 utilizes a UMA—Radio Link Control (UMA-RLC) data link sub-layer protocol, and the first communication modules 210 utilizes a GSM-RLC data link sub-layer protocol.

in the example illustrated in FIG. 4, when the mobile communication terminal 200 initiates a service (such as, for example, a Call Control (CC), a Supplementary Service (SS) or a Short Message Service (SMS)), at a Service Access Point (SAP) (shown as point (1) in FIG. 4), either a UMA-RR protocol or a GSM-RR protocol is selected. To communicate with a GAN AP (via the second communication module 220), the UMA-RR protocol is selected (as shown in FIG. 4), and to communicate with a GSM network (via the first communication module 210), the GSM-RR protocol is selected. When the second communication module 220 is activated, a signal is sent from the UMA-RR sub-layer to the GSM-RR sub-layer (shown as point (2) in FIG. 4) to inform the first communication module 210 of the same. In response to receipt of the signal, the first communication module switches to the hibernation mode, by de-activating a Link Access Protocol on the Dm Channel (LAPDm) data link sub-layer protocol and a GSM baseband protocol.

In the example illustrated in FIG. 5, when the mobile communication terminal 200 initiates a packet service (such as, for example, WAP, MMS, JAVA, IM or SyncML), at a Service Access Point (SAP) (shown as point (1) in FIG. 5), either a UMA-RLC protocol or a GSM-RLC protocol is selected. To communicate with a GAN AP (via tile second communication module 220), the UMA-RLC protocol is selected (as shown in FIG. 5), and to communicate with a GPRS network (via the first communication module 210), the GSM-RLC protocol is selected. When the second communication module 220 is activated, a signal is sent from the UMA-RLC sub-layer to the GSM-RLC sub-layer (shown as point (2) in FIG. 4) to inform the first communication module 210 of the same. In response to receipt of the signal, the first communication module switches to the hibernation mode, by de-activating a Media Access Control (MAC) data link sub-layer protocol and a GPRS baseband protocol.

Figure 6:
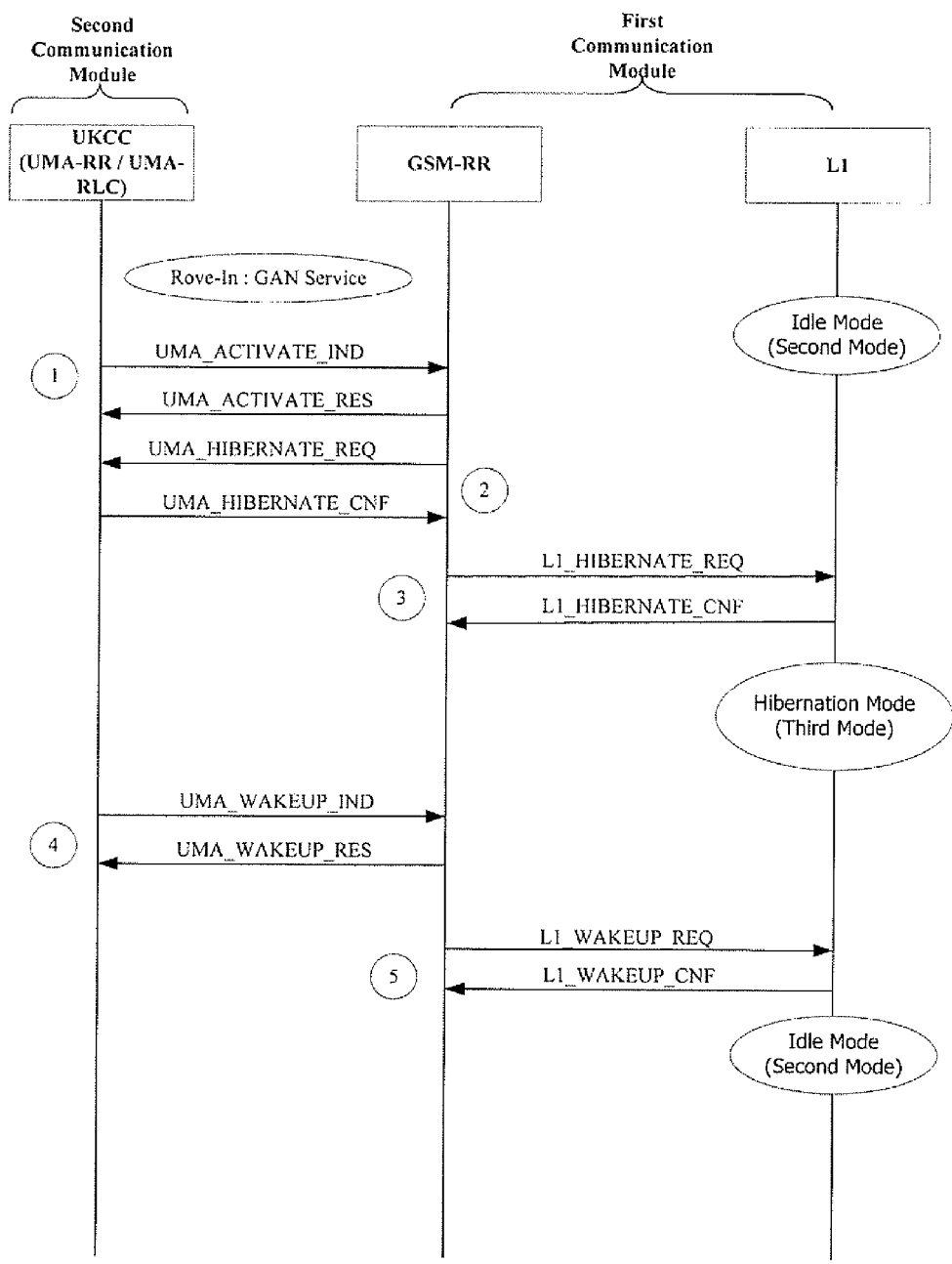
FIG. 6 illustrates an example of signaling which may be performed to switch the first communication module 210 between the idle mode and the hibernation mode, when the mobile communication terminal 200 operates in accordance with FIG. 4.
Figure 7:
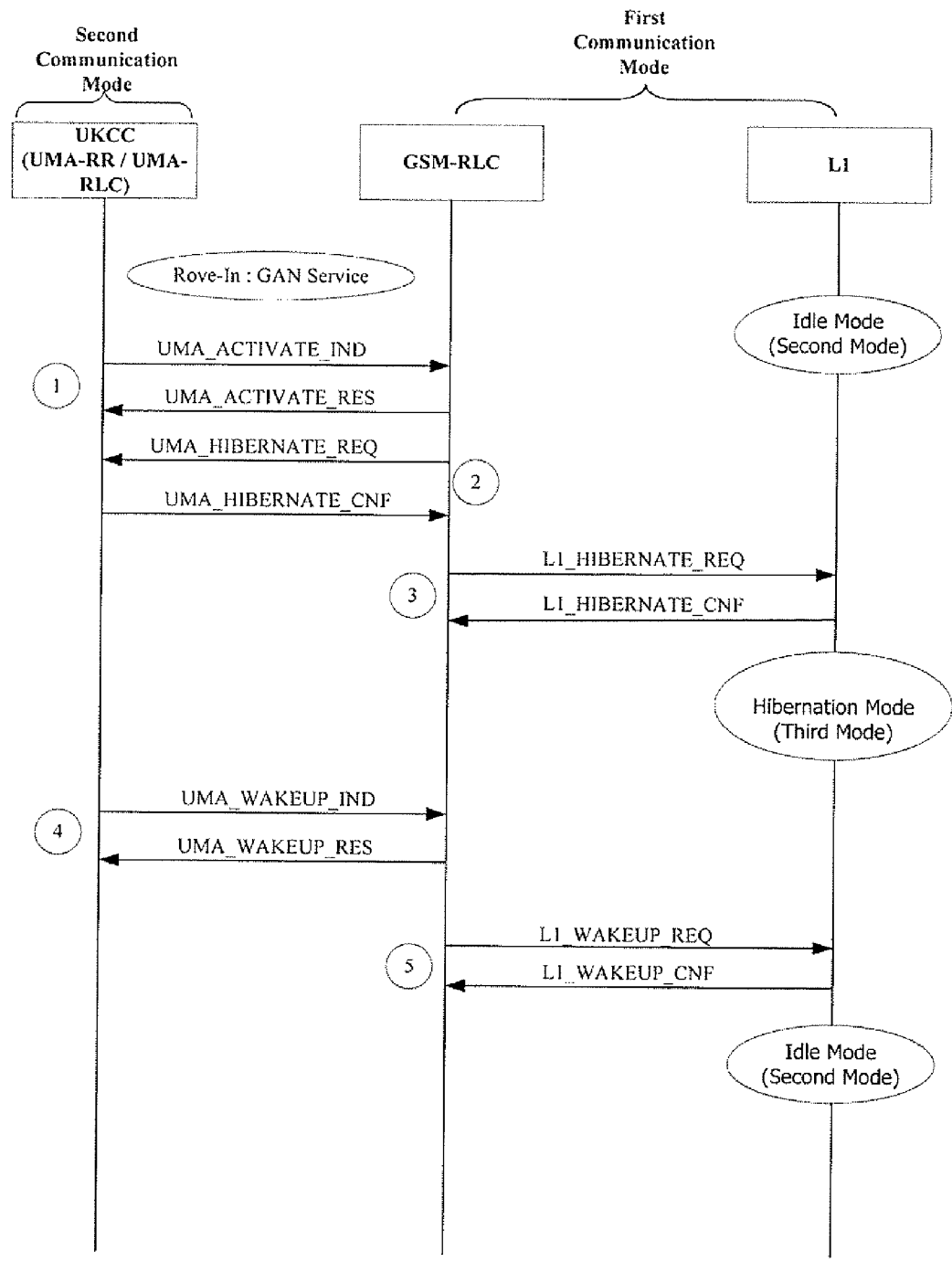
FIG. 7 illustrates an example of signaling which may be performed to switch the first communication module 210 between the idle mode and the hibernation mode, when the mobile communication terminal 200 operates in accordance with FIG. 5.

FIG. 6 illustrates an example of signaling which may be performed to switch the first communication module 210 between the idle mode and the hibernation mode, when the mobile communication terminal 200 operates in accordance with FIG. 4. FIG. 7 illustrates an example of signaling which may be performed to switch the first communication module 210 between the idle mode and the hibernation mode, when the mobile communication terminal 200 operates in accordance with FIG. 5, When the second communication module 220 is activated (such as, for example, when the mobile communication terminal 200 enters into the service area of a GAN AP), the UMA-RR (FIG. 6) or UMA-RLC (FIG. 7) of the second communication module 220 sends a signal which indicates the activation ('UMA_ACTIVATE_IND') and a corresponding primitive to the GSM-RR (FIG. 6) or GSM-RLC (FIG. 7) of the first communication module 210, as shown at point (1) in FIGS. 6 and 7. The GSM-RR (FIG. 6) or GSM-RLC (FIG. 7) of the first communication module 210 then sends a response signal 'UMA_ACTIVATE_RES' to the UMA-RR (FIG. 6) or UIMA-RLC (FIG. 7) of the second communication module 220.

Next, the GSM-RI (FIG. 6) or the GSM-RLC (FIG. 7) of the first communication module 210 sends a signal to the UMA-RR (FIG. 6) or UMA-RLC (FIG. 7) of the second communication module 220 to inform it that the first communication module 210 will switch to the hibernation mode ('UMA$_{HIBERNATE}$_REQ'), as shown at point (2) in FIGS. 6 and 7. Then, the UMA-RR (FIG. 6) or UMA-RLC (FIG. 7) of the second communication module 220 sends a confirmation signal ('UMA_HIBERNATE_CNF') back to the GSM-RR (FIG. 6) or the GSM-RLC (FIG. 7) of the first communication module 210.

Next, at point (3), the GSM-RR (FIG. 6) or the GSM-RLC (FIG. 7) of the first communication module 210 sends a signal ('L1_HIBERNATE_REQ') to the physical layer (L1) of the first communication module 210, commanding it to switch to the hibernation mode. The physical layer send a confirmation signal back to the GSM-RR (FIG. 6) or the GSM-RLC (FIG. 7), and then switches to the hibernation mode.

Subsequently, the second communication module 220 may be de-activated (such as, for example, when the mobile communication terminal 200 leaves the service area of a GAN AP, when the user deactivates the second communication module 220, or when the user requests that the first communication module 210 be used). When this occurs, the UMA-RR (FIG. 6) or UMA-RLC (FIG. 7) of the second communication module 220 sends a wake-up signal to the GSM-RR (FIG. 6) or the GSM-RLC (FIG. 7) ('UMA_WAKEUP_IND'), as shown at point (4). The GSM-RR (FIG. 6) or the GSM-RLC (FIG. 7) then sends a response ('UMA_WAKEUP_RES') back to the UMA-RR (FIG. 6) or UMA-RLC (FIG. 7).

Then, the GSM-RR or the GSM-RLC of the first communication module 210 sends a signal to the physical layer ('L1_WAKEUP_REQ') to switch it back to the idle mode, as shown at point (5). The physical layer sends a confirmation signal ('L1_WAKEUP_CNF') back to the GSM-RR or the GSM-RLC, and the switches from the hibernation mode to the idle mode.

FIG. 8 is a flow chart illustrating a process of reducing power consumption by changing the first communication module to the hibernation mode, and FIG. 9 is a flow chart illustrating the process of releasing the hibernation mode.

With reference to FIG, 8, a signal indicating that the second communication module 220 has been activated is received (step S101).

As mentioned above, the signal can be received through the controller 230 and/or the communication module controller 231. The second communication module 220 may be activated, for example, when requested by the user when the mobile communication terminal 200 enters the service area of a GAN AP, or when the second communication module 220 connects to the GAN AP.

Subsequently, the first communication module 210 is switched to the hibernation mode in response to the received signal (step S102).

With reference to FIG. 9, a signal indicating that the second communication module 220 has been deactivated is received (step S201). The second communication module 220 may be deactivated, for example, when requested by the user, when the mobile communication terminal 200 leaves the service area of a GAN AP, or when communication through the first communication module 210 is requested.

Then, in response to the received signal, the hibernation mode of the first communication module 210 is released (step S202).

When a request for performing a communication service through the first communication module 210 is received from the user, the first communication module 210 switches to the dedicated mode (step S203).

According to the power saving method of the present invention, power consumption can be considerably reduced as noted in the following experimentation values:

An Amount of Power Consumption in the Dedication Mode
1. In talking
Strong signal area: 150 mA
Weak signal area: max 300 mA
2. In mute
Strong signal area : 85 mA
Weak signal area: max 240 mA
An Amount of Power Consumption in the Idle Mode
When stopped: 4.5 mA
When moving : 9.2 mA
Weak signal area: 15 mA
Service unavailable area: 10 mA
An Amount of Power Consumption in the Hibernation Mode
~2-3 mA, regardless of strength of electric field and movement As described above, the mobile communication terminal and the method capable of reducing power consumption of a first communication module according to activation of a second communication module, in accordance with the present invention have the following advantages.

In the mobile communication terminal which includes both the first communication module which communicates with a licensed network and the second communication module which communicates with a GAN, when the second communication module is activated, the first communication module is controlled not to be operated, thereby reducing power consumption.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In particular, the present invention has been described based on the GSM/GPRS, but its scope should be interpreted to comprehensively include the CDMA, TDMA, WCDM and IMT-2000.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

In accordance with various embodiments of the present disclosure, the methods described herein may be implemented by software programs executable by a processor. The present disclosure contemplates a computer-readable medium that includes instructions or receives and executes instructions responsive to a propagated signal. The term "computer-readable medium" shall include any medium that is capable of storing, encoding or carrying a set of instructions for execution by a processor to perform any one or more of the methods or operations disclosed herein.

In a particular non-limiting, exemplary embodiment; the computer-readable medium can include a solid-state memory such as, for example, a memory card or other package that houses one or more non-volatile read-only memories. Further, the computer-readable medium may be a random access memory or other volatile re-writable memory. Accordingly, the disclosure is considered to include any one or more of a computer-readable medium or a distribution medium and other equivalents and successor media, in which data or instructions may be stored.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A mobile communication terminal, comprising:
a first communication module which communicates with a licensed network;
a second communication module which communicates with a generic access network, wherein the generic access network is an unlicensed network; and
a controller which switches the first communication module between a first mode and a second mode according to whether the second communication module is in a third mode,
wherein:
the first mode is a lower power mode than the second mode,
the second mode is a lower power mode than the third mode,
in the first mode, no voice communication, data communication, or cell detection, selection, or reselection are performed,
in the second mode, at least one of cell detection, selection or reselection is performed but no voice or data communication is performed, in the third mode, voice or data communication is performed, the controller automatically switches the first communication module from the second mode to the first mode when the second communication module is activated, and the controller automatically switches the first communication module from the first mode to the second mode when the second communication module is de-activated, the first communication module only receives signals from the licensed network, and the second communication module only receives signals from the unlicensed.

2. The terminal according to claim 1, wherein the controller switches the first communication module to the first mode when it is recognized that the second communication module has entered the third mode.

3. The terminal according to claim 1, wherein the second communication module enters the third mode when a user of the mobile communication terminal requests that communication with the generic access network be performed.

4. The terminal according to claim 1, wherein the second communication module enters the third mode when the mobile communication terminal enters a service area of the generic access network.

5. The terminal according to claim 1, wherein the second communication module enters the third mode when a connection with an access point of the generic access network is initiated.

6. The terminal according to claim 1, wherein the first communication module does not perform voice or data communication, cell detection, cell selection or cell re-selection when it is in the first mode, the first mode corresponding to a hibernation mode.

7. The terminal according to claim 1, wherein the controller switches the first communication module from one of the first, second, or third modes to another one of the first, second, or third modes when it is recognized that the second communication module has been deactivated.

8. The terminal according to claim 7, wherein the second communication module is switched to the first or second mode when a user requests termination of communication with the generic access network.

9. The terminal according to claim 7, wherein the second communication module is switched to the first or second mode when the mobile communication terminal leaves a service area of the generic access network.

10. The terminal according to claim 7, wherein the second communication module is switched to the first or second mode when a user requests termination of a connection to an access point of the generic access network.

11. The terminal according to claim 1, wherein the first mode is a hibernation mode, the second mode is an idle mode, and the third mode is an activated mode.

12. The terminal according to claim 11, wherein initiating an operation to perform cell searching, cell selection or cell re-selection through the first communication module switches the first communication module to the idle mode.

13. The terminal according to claim 1, wherein the first communication module is switched from one of the first, second, or third modes to another one of the first, second, or third modes by applying greater power to the first communication module.

14. The terminal according to claim 1, wherein the controller switches the first communication module to a dedicated mode when a condition is satisfied.

15. The terminal according to claim 14, wherein the controller switches the first communication module to the dedicated mode when a user of the mobile communication terminal initiates a voice or data communication with the licensed network.

16. A method for reducing power consumption in a mobile communication terminal including a first communication module which communicates with a licensed network and a second communication module which communicates with a generic access network, wherein the generic access network is an unlicensed network, comprising:

recognizing that the second communication module has entered a third mode; and changing the first communication module to a first mode from a second mode in response to the second communication module entering the third mode, wherein:

the first mode is a lower power mode than the second mode, the second mode is a lower power mode than the third mode, in the first mode, no voice communication, data communication, or cell detection, selection, or reselection are performed, in the second mode, at least one of cell detection, selection or reselection is performed but no voice or data communication is performed, and in the third mode, voice or data communication is performed, the first communication module is automatically switched from the second mode to the first mode when the second communication module is activated, and the first communication module is automatically switched from the first mode to the second mode when the second communication module is de-activated, wherein the first communication module only receives signals from the licensed network and the second communication module only receives signals from the unlicensed.

17. The method according to claim 16, wherein the second communication module enters the third mode when a user of the mobile communication terminal requests that communication with the generic access network be performed.

18. The method according to claim 16, wherein the second communication module enters the third mode when the mobile communication terminal enters a service area of the generic access network.

19. The method according to claim 16, wherein the second communication module enters the third mode when a connection with an access point of the generic access network is initiated.

20. The method according to claim 16, wherein the first mode is a hibernation mode.

21. The method according to claim 20, wherein the first communication module does not perform voice or data communication, cell detection, cell selection or cell re-selection when it is in the hibernation mode.

22. The method according to claim 16, further comprising:

recognizing that the second communication module has switched out of the third mode; and switching the first communication module from one of the first, second or third mode to another one of the first, second, or third mode in response to the recognition of the second communication module switching out of the third mode.

23. The method according to claim 22, wherein the second communication module switches from the third mode when a user requests termination of communication with the generic access network.

24. The method according to claim 22, wherein the second communication module switches from the third mode when the mobile communication terminal leaves a service area of the generic access network.

25. The method according to claim 22, wherein the second communication module switches from the third mode when a user requests termination of a connection to an access point of the generic access network.

26. The method according to claim 22, wherein the first mode is a hibernation mode, the second mode is an idle mode, and the third mode is an activated mode.

27. The method according to claim 26, wherein initiating an operation to perform cell searching, cell selection or cell re-selection through the first communication module switches the first communication module to the idle mode.

28. The method according to claim 22, wherein the first communication module is switched to said another mode by applying greater power to the first communication module.

29. The method according to claim 16, further comprising:
receiving a request to perform a communication with the first communication module from a user; and switching the first communication module to a dedicated mode according to the request.

30. The method according to claim 29, wherein the first communication module is switched to the dedicated mode by applying greater power to the first communication module.

31. A method for reducing power consumption in a mobile communication terminal including a first communication module which communicates with a licensed network and a second communication module which communicates with a generic access network, wherein the generic access network is an unlicensed network, comprising:
notifying, by an upper layer of the second communication module, an upper layer of the first communication module that the second communication module has entered a third mode;
requesting, by the upper layer of the first communication module, a physical layer of the first communication module to enter a first mode from a second mode in response to the notification; and
entering, by the physical layer, the first mode in response to the request, wherein:
the first mode is a lower power mode than the second mode,
the second mode is a lower power mode than the third mode,
in the first mode, no voice communication, data communication, or cell detection, selection, or reselection are performed,
in the second mode, at least one of cell detection, selection or reselection is performed but no voice or data communication is performed, and
in the third mode, voice or data communication is performed,
the first communication module automatically switches from the second mode to the first mode when the second communication module enters the third mode, and
the first communication module automatically switches from the first mode to the second mode when the second communication module is switch from the third mode to one of the first mode or the second mode, the first communication module only receives signals from the licensed network and the second communication module only receives signals from the unlicensed.

32. The method according to claim 31, further comprising:
notifying, by the upper layer of the second communication module, the upper layer of the first communication module that the second communication module has switched from the third mode;
requesting, by the upper layer of the first communication module, the physical layer of the first communication module to enter from one of the first, second, or third mode to another one of the first, second, or third mode in response to the notification; and
entering, by the physical layer, said another one of the first, second, or third mode in response to the request.

33. The method according to claim 31, wherein the upper layer of the first communication module is a GSM-RR sub-layer, and the tipper layer of the second communication module is a UMA-RR sub-layer.

34. The method according to claim 31, wherein the upper layer of the first communication module is a GSM-RLC sub-layer, and the upper layer of the second communication module is a UMA-RLC sub-layer.

* * * * *